United States Patent
Choi

(10) Patent No.: US 6,195,265 B1
(45) Date of Patent: Feb. 27, 2001

(54) APPARATUS FOR PREVENTING ELECTROMAGNETIC INTERFERENCE BETWEEN A PORTABLE COMPUTER AND A DOCKING STATION

(75) Inventor: Phil-Kyu Choi, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/201,128

(22) Filed: Nov. 30, 1998

(30) Foreign Application Priority Data

Dec. 1, 1997 (KR) .................................. 97-65104

(51) Int. Cl.$^7$ ........................................ H05K 7/14
(52) U.S. Cl. .................. 361/799; 361/816; 361/818; 361/753; 174/35 R
(58) Field of Search .................... 361/752, 753, 361/799, 800, 801, 814, 816, 818, 212, 220, 683, 684, 685, 686; 174/35 GC, 35 R; 439/607

(56) References Cited

U.S. PATENT DOCUMENTS

| | | |
|---|---|---|
| 4,855,873 | 8/1989 | Bhargava et al. . |
| 5,004,866 | 4/1991 | Cooke et al. . |
| 5,210,681 * | 5/1993 | Hosoi et al. ............ 361/686 |
| 5,434,743 * | 7/1995 | Hosoya et al. ........... 361/686 |
| 5,488,572 * | 1/1996 | Belmont ................ 361/683 |
| 5,504,648 * | 4/1996 | Honda et al. ........... 361/686 |
| 5,604,663 * | 2/1997 | Shin et al. ............. 361/686 |
| 5,644,474 * | 7/1997 | Jang ................... 361/753 |
| 5,777,264 | 7/1998 | Chen . |
| 5,784,253 * | 7/1998 | Ooka et al. ............ 361/686 |
| 5,841,639 * | 11/1998 | Schnoor et al. .......... 361/796 |
| 6,028,767 * | 2/2000 | Lan .................... 361/686 |
| 6,119,184 * | 9/2000 | Takahama .............. 361/683 |

* cited by examiner

Primary Examiner—Jeffrey Gaffin
Assistant Examiner—Phuong T. Vu
(74) Attorney, Agent, or Firm—Robert E. Bushnell, Esq.

(57) ABSTRACT

A device that prevents electromagnetic interference between a portable computer and a docking station, that are electrically connected via interface ports, while the portable computer is used with the docking station may be integrated with a computer system. The computer system may be constructed using a first conduction member that may be made of a conductive metal strip material that is mounted on the docking station while also being grounded to the docking station. A second conduction member that is made of a conductive material is inserted in the bottom side of a portable computer and is also grounded to the portable computer. The first conduction member is electrically connected to the second conduction member while the portable computer is engaged with the docking station. Together, the first and second conduction members join the grounds of the portable computer and the docking station to effectively prevent the leakage of electromagnetic waves between the devices.

20 Claims, 6 Drawing Sheets

APPARATUS FOR PREVENTING ELECTROMAGNETIC INTERFERENCE BETWEEN A PORTABLE COMPUTER AND A DOCKING STATION

CLAIM OF PRIORITY

This application makes reference to, incorporates the same herein, and claims all rights accruing thereto under 35 U.S.C. §119 through my patent application entitled *Apparatus for Preventing Electromagnetic Interference Between Portable Computer and Expansion System* earlier filed in the Korean Industrial Property Office on the 1st day of December 1997 and there duly assigned Ser. No. 1997/65104.

BACKGROUND OF THE INVENTION

1. Field of the Invention

The present invention relates, in general, to an apparatus for preventing electromagnetic interference between a portable computer and an docking station and, more particularly, to an apparatus that grounds the portable computer and docking station to reduce the electromagnetic interference between the portable computer and the docking station.

2. Background Art

Recently, portable computers have become a popular alternative to traditional desktop computers in terms of their movability, simplicity, and various functions. Furthermore, various expansion devices, such as docking stations, have been developed that enable the portable computer to extend its battery life as well as its multimedia capabilities. This development has been spurred by users'desires to overcome the inherent functional limitations, with respect to size, weight, and battery life, of portable computers. Some common expansion, also referred to as peripheral, devices are, for example, external speakers, external CD-ROM drives, external batteries, or AC adapters. These peripherals can often be incorporated into, or interfaced through, a docking station that is specifically designed for a particular type of portable computer.

Usually, a docking station has a special connector, also referred to as a port replicator, that allows the portable computer to interface with peripheral devices, that are attached to the docking station, such as an external display device, a mouse, a keyboard, or a pair of speakers. The port replicator is coupled to an expansion port that is positioned on the rear side of the portable computer, to allow the electrical and mechanical connection of the portable computer with the docking station. With this connection, the peripheral devices and the portable computer can be integrated to enhance the functionality of the portable computer.

To improve the performance and prevent the degradation of the complex electrical systems involved in computer systems using a portable computer and docking station, devices that reduce electromagnetic radiation are constantly being developed. Some examples of techniques for reducing electromagnetic radiation are shown, for example, in U.S. Pat. No. 4,855,873 to Bhargava entitled *Standoff and Grounding Clip Assembly*, U.S. Pat. No. 5,004,866 to Cooke entitled *Self-Contained Grounding Strip*, and U.S. Pat. No. 5,777,264 to Chen entitled *Grounding Structure for Extractable Harddisk*.

The contemporary art, however, does not provide a device that effectively shields or reduces the electromagnetic waves that are generated by both the docking station and the portable computer. Since the port of the typical docking station is connected to the port of the portable computer without the use of any shielding, electromagnetic waves that are generated from both the docking station and the portable computer leak through the interface ports to interfere with other electrical systems.

As such, I believe that it may be possible to improve on the contemporary art by providing a device that can reduce the electromagnetic radiation leakage between the docking station and the portable computer that still occurs along the interface ports between the two devices.

SUMMARY OF THE INVENTION

Accordingly, an object of the present invention is to provide a device that can reduce the electromagnetic radiation leakage between the docking station and the portable computer that still occurs along the interface ports between the two devices, thus almost completely preventing electromagnetic interference between the portable computer and the docking station while the computer is used simultaneously with the docking station.

To achieve these and other objects, a device is provided that prevents electromagnetic interference between a portable computer and a docking station, that are electrically connected via interface ports, while the portable computer is used with the docking station. A computer system using the device may be constructed using a first conduction member that may be made of a conductive metal strip material that is mounted on the docking station while also being grounded to the docking station. A second conduction member that is made of a conductive material is inserted in the bottom side of a portable computer and is also grounded to the portable computer. The first conduction member is electrically connected to the second conduction member while the portable computer is engaged with the docking station. Together, the first and second conduction members join the grounds of the portable computer and the docking station to effectively prevent the leakage of electromagnetic waves between the devices.

The second conduction member may be formed using an insert member, or plug, that is inserted in a hole formed in a bottom side of the housing of a portable computer. The plug may be grounded to a conductive layer that is formed on an inner surface of the computer housing. The first conduction member is mounted to the top surface of a tray portion of the docking station and is grounded to the housing of the docking station.

Alternatively, a docking station may be used that uses a tray and structure component that are not manufactured as an integral piece. This type of a docking station would require the engagement of the tray of a docking station with a structure, or port bearing, component to form the docking station. Such a docking station may be constructed using a first part, or tray, and a second part, or structure, that may be assembled with each other into a single body to form the docking station. The tray portion provides a seat for the portable computer and can have a recess or depression formed in the tray that allows the first conduction member to be recessed in a lower position in the tray portion of the docking station. The structure portion, or port bearing portion, has an extension wall, or top wall, that extends over a portion of the tray after the structure and the tray are attached to form the docking station. The top wall covers the depression in the tray and allows only a portion of the first conduction member to penetrate the top wall through a hole, or bore.

While the first conduction member only protrudes partially above the top wall, contact can be made between the first conduction member and the second conduction member to ground the conductive material in the portable computer to the housing of the docking station.

In the above apparatus, the first part of the docking station is made of a conduction material. The first conduction member may be constructed using a conductive strip of sheet metal having a predetermined length and width. The sheet metal body is bent into a specific configuration and is fixed to the bottom surface of the depression at a first end. The sheet metal strip has a terminal located on a middle portion so that a portion of the first conductive member passes through the hole, or bore, in the top wall to project upwardly. The second conduction member may be constructed using an plug shaped member that is inserted in a hole formed in a bottom side of the portable computer. The second conductive member is grounded to a conductive layer formed on an inner surface of the housing of the portable computer.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE DRAWINGS

Figure 1:
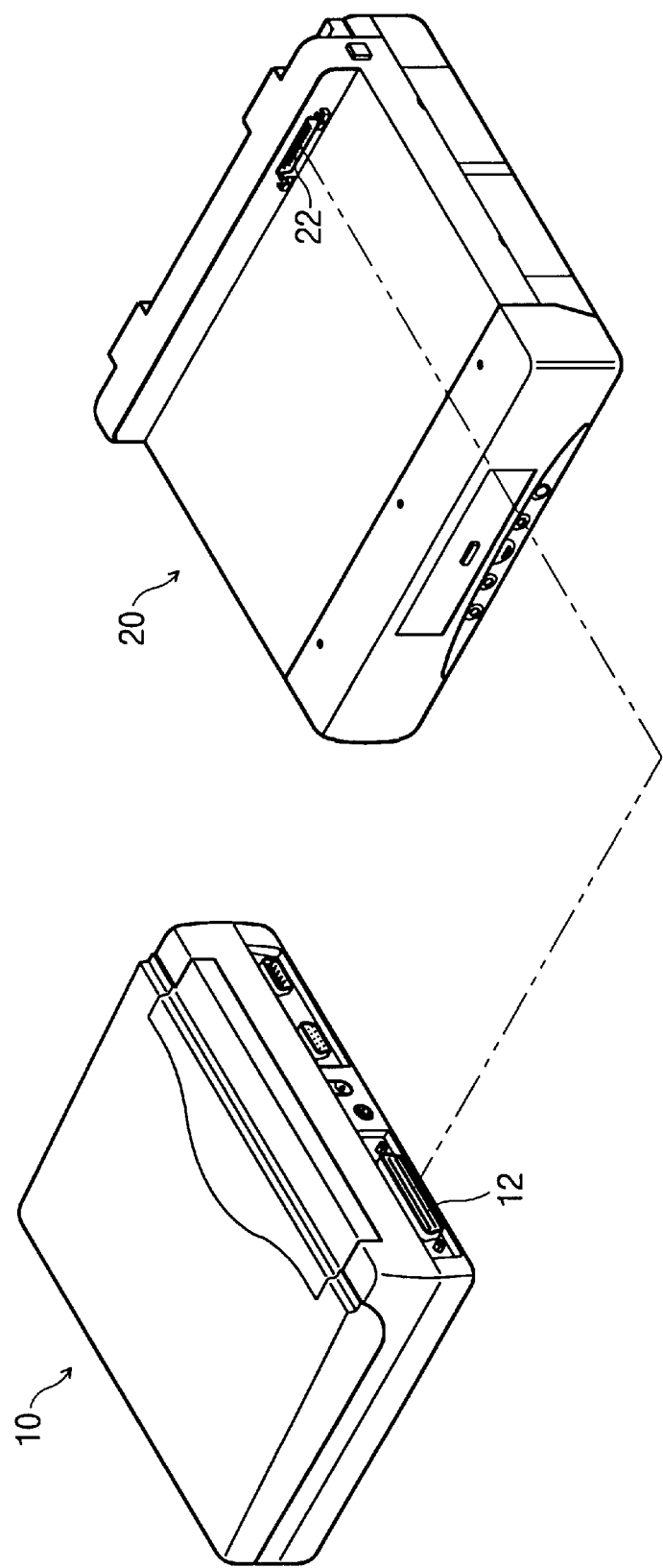
FIG. 1 is a perspective view illustrating a portable computer and a docking station.
Figure 2:
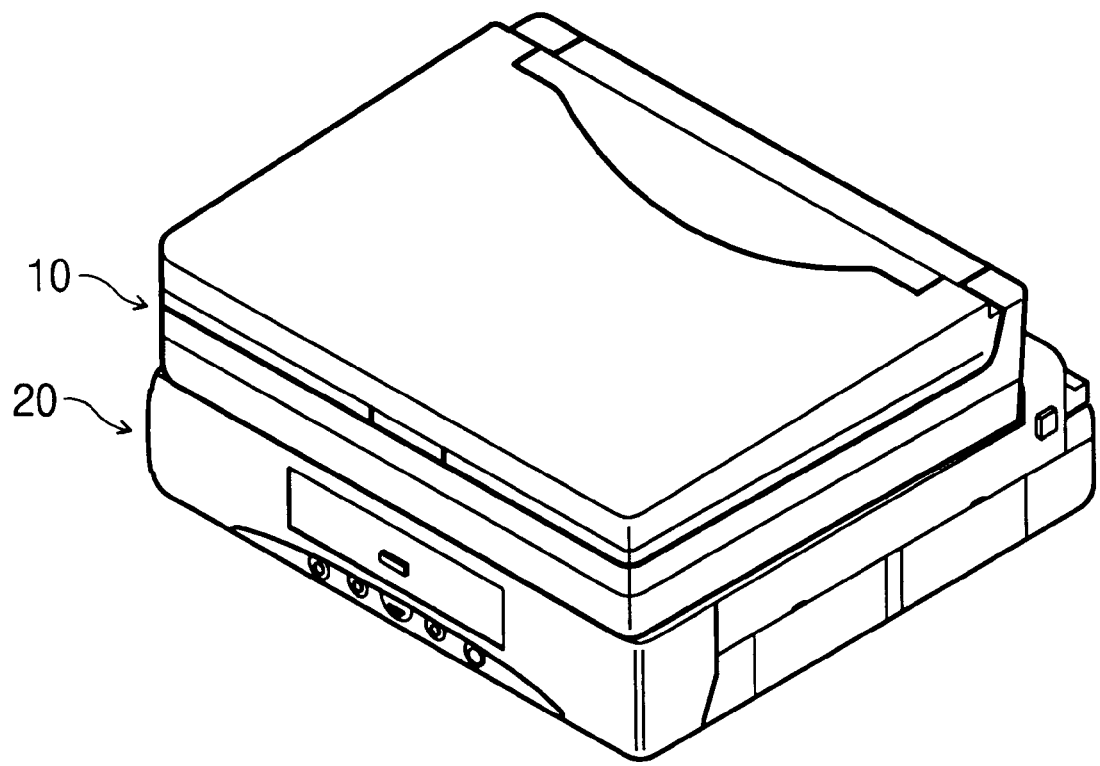
FIG. 2 is a perspective view of a docking station engaged with a portable computer.

Turning now to the drawings, FIGS. 1 and 2 illustrate docking station 20 that can expand the functionality of portable computer 10. Docking station 20 allows the portable computer 10 to carry out functions normally only expected from a desktop personal computer. Docking station 20 has port 22 that can engage port 12 of portable computer 10, to electrically connect portable computer 10 to docking station 20. This allows the docking station to receive signals from computer 10 and to send signals to computer 10.

Figure 3:
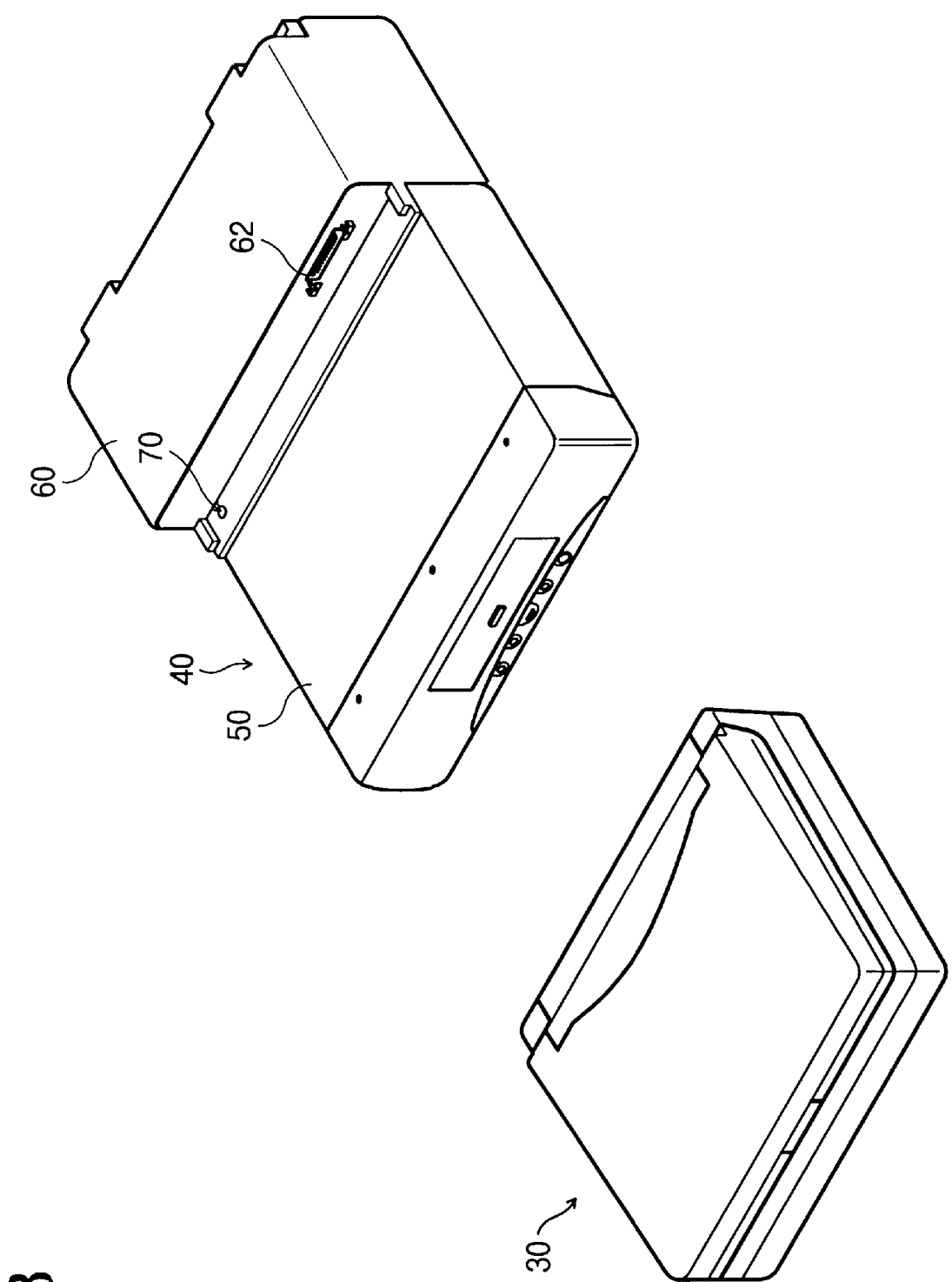
FIG. 3 is a perspective view illustrating a portable computer and a docking station having an electromagnetic wave reducing device as constructed in accordance with principles of the preferred embodiment of the present invention.

FIG. 3 is a perspective view of portable computer 30 and docking station 40 with electromagnetic wave reducing apparatus 70 that has components installed in both the portable computer and in the docking station as constructed in accordance with the principles of the preferred embodiment of the present invention. As shown in the drawing, the electromagnetic wave reducing apparatus may be constructed using first conduction member 70 and second conduction members 36. First conduction member 70 is attached to tray portion 50 if the docking station in depression 52 that is located on the top side of the tray portion. Second conduction member 36 is inserted in bottom side 32 of the portable computer in bore 38. When portable computer 30 is engaged with docking station 40, first and second conduction members 36 and 70 are brought into electrical contact with each other, thus preventing electromagnetic waves that are generated from both the portable computer and the docking station from interfering with the electrical devices.

Figure 4:
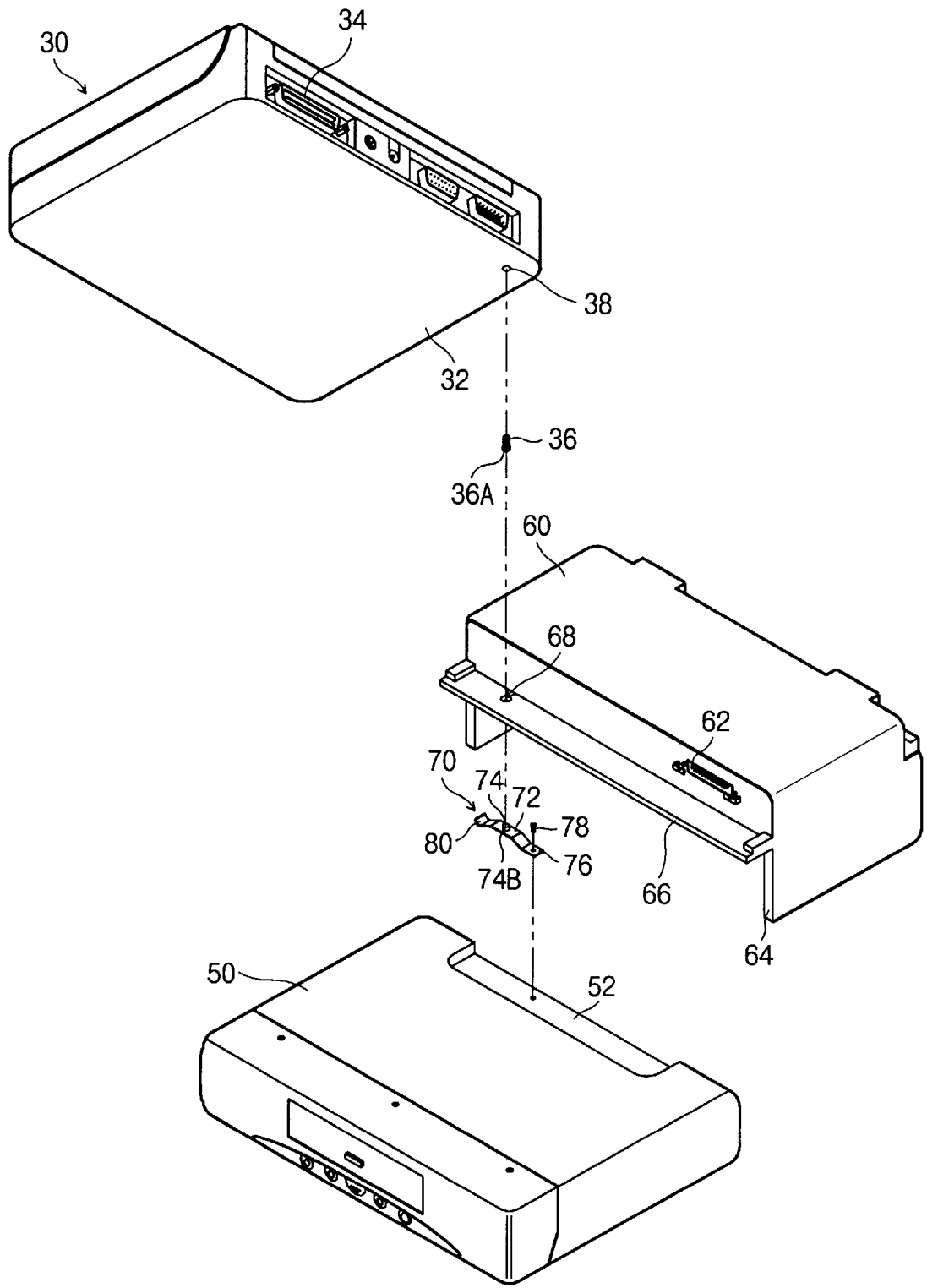
FIG. 4 is an exploded perspective view showing the device of FIG. 3 installed in both the portable computer and the docking station of a computer system.

FIG. 4 is an exploded perspective view showing the electromagnetic wave reducing apparatus of this invention installed in both computer 30 and docking station 40. Structure portion 60 of the docking station has top wall 66 that protrudes and covers depression 52 while structure 60 is engaged with tray 50. First interface port 34 is located on the portable computer and second interface port 62 is located on the docking station. Hole 68 in top wall 66 allows a portion of first conduction member 70 to protrude past the top wall. Once the first conduction member is engaged with the second conduction member 36, top surface 74B of the first conduction member is in contact with bottom surface 36A of the second conduction member. Fastener 78 secures first end 76 of the first conduction member to the bottom surface of depression 52 and second end 80 has a shape that allow the first conduction member to move in an elastic manner. Central portion 72 of the first conduction member has embossed portion 74.

Figure 5:
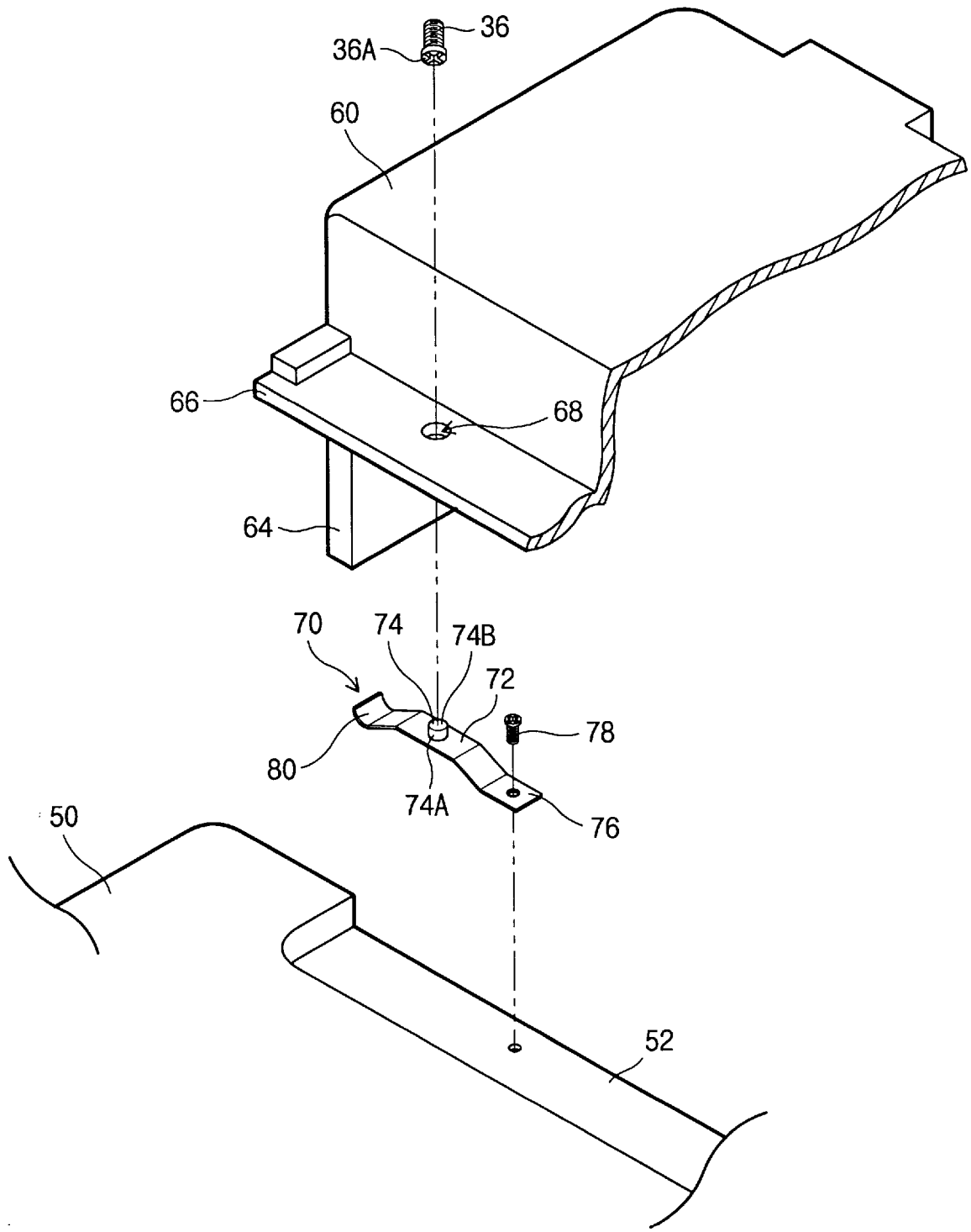
FIG. 5 is an exploded perspective view showing the construction of the apparatus of FIG. 3.

FIG. 5 is an exploded perspective view showing the construction of the electromagnetic wave reducing apparatus of this invention. As shown in FIGS. 4 and 5, first conduction member 70 of the electromagnetic wave reducing apparatus has a specific configuration, that allows the device to have elasticity. It should be understood that when the term "specified shape" is used in the claims, that the shape referred to is that shown in FIG. 5 or another shape that would yield the same properties or providing elasticity and being able to protrude through bore 68 in the top wall while having first end 76 fixed to the bottom of depression 52. When terminal 74 is inserted in hole 68 surface 74A comes into contact with the inner surface of hole 68. Second conduction member 36 is positioned in the bottom surface of the housing of portable computer 30. When computer 30 is used with docking station 40, bottom surface 32 of computer 30 is brought into contact with the top surface of the tray portion of docking station 40.

Docking station 40 may be constructed as an integral whole or it may be manufactured as two separate components. When the docking station is composed of two separate parts that can be attached, a first part, or tray, 50 is attached to second part, or structure 60. First part, or tray, 50 provides a seat for portable computer 30 to be mounted on and is assembled with second part 60 into a single body. Second part 60 may be constructed using engaging wall, or top wall, 64 that engages tray portion 60 when both parts are assembled into a docking station. Top wall 66 has a predetermined width and extends from engaging wall 64 to be positioned on the top surface of the tray portion 50. Structure portion 60 also has a second interface port 62 at a position corresponding to first interface port 34 of portable computer 30 so that the two ports 34 and 62 engage with each other when portable computer 30 is set on the docking station 40. Auxiliary devices for computers, such as a floppy disk drive, hard disk drive and CD-ROM drive, may be installed in tray portion 50 of docking station 40. Meanwhile, structure portion 60 of docking station 40 encases an electronic circuit which is used for electrically connecting the portable computer 30 to outside equipment. In the above preferred embodiment, the docking station 40 comprises may be constructed of two separate parts, tray portion 50 and structure portion 60. However, it should be understood that the docking station 40 is not divided into two parts during the operation of the docking station. Whether the docking station is composed of two separate pieces or an integral whole is relevant for manufacturing purposes to provide more efficient assembly. Therefore, the electromagnetic wave reducing apparatus of this invention can be used with either a sectioned docking station or an integrated docking station without affecting the functioning of this invention.

In the preferred embodiment, the structure portion 60 engages with the rear portion of the tray portion 50 at the engaging wall 64 as shown in FIGS. 4 and 5. In the case of using a docking station made up of separate components that are assembled into a docking station, top wall 66 of structure portion 60 is positioned above depression 52 that is formed on the rear portion of tray portion 50. First conduction member 70 is installed on the bottom surface of depression 52 so that embossed middle portion 74 of first conduction member 70 passes through hole, or bore, 68 of top wall 66 to project to a predetermined height. When tray portion 50 of docking station 40 is made of a conductive material, first conduction member 70 is grounded to tray portion 50. However, when the tray portion 50 is not made of a conductive material, the first conductive member 70 is grounded to a conductive element installed in the tray portion 50.

First conduction member 70 is made of a conductive sheet metal, which has a length and width and is bent into a specific configuration. First conduction member 70 is fixed to the bottom surface of depression 52 at first end 76 using a locking member and has a terminal 74 attached to middle portion 72. Terminal 74 passes through hole 68 of top wall 66 to project from the hole 68 to a height. First conduction member is bent into a specific configuration and is fixed to the bottom surface of the depression 52 using set screw 78 or other fastener at first end 76. Second end 80 of the first conduction member 70 abuts the bottom surface of depression 52 in a manner that said end 80 always comes into frictional contact with the bottom surface of depression 52 due to elasticity of first conduction member 70.

Second conduction member 36 is inserted into bottom surface 32 of portable computer 30 at a position corresponding to terminal 74 of the first conduction member 70. Second conduction member 36 electrically contacts terminal 74 of first conduction member 70 while portable computer 30 is engaged with docking station 40. Second conduction member 36 is made of a conductive material and is grounded to portable computer 30. That is, second conduction member 36 is an insert member that is positioned in hole 38 that is formed on the bottom side of the portable computer. Of course, it should be understood that a metal insert member may be separately produced and used as the second conduction member 36 without affecting the functioning of this invention. Such a second conduction member 36 is grounded to a conductive layer, formed on the interior surface of the portable computer housing.

Figure 6:
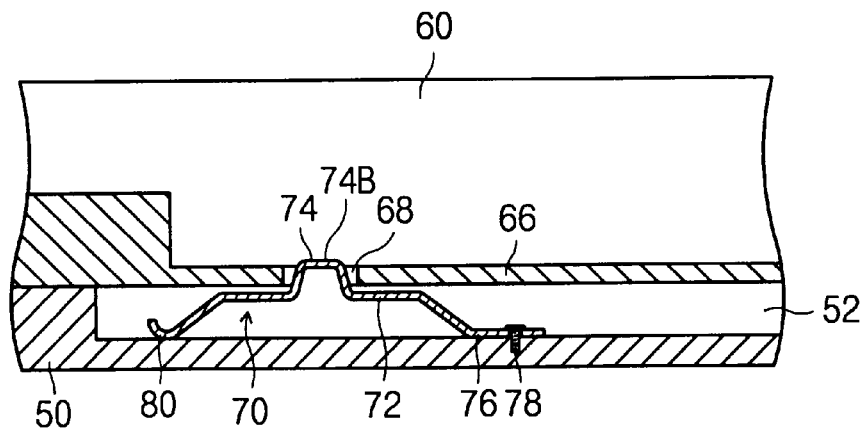
FIG. 6 is a sectional view showing the apparatus of FIG. 3.

FIG. 6 is a cross-sectional view showing first conduction member 70 installed in docking station 40. First conduction member 70 is set on the bottom surface of depression 52 in the tray portion 50 of the docking station 40. Terminal 74, formed at the middle portion of first conduction member 70, passes through hole 68 of top wall 66 of structure portion 60, thus projecting from the hole, or bore, 68 to a predetermined height. When terminal 74 projects through hole 68 top surface 74B of the first conduction member is ready to engage the second conduction member. Fixed end, or first end, 76 of the first conduction member 70 is mounted to the bottom surface of the depression 52 of the tray portion 50 using a set screw 78 or a rivet, thus being grounded to the tray portion 50. Free end, or second end, 80 of first conduction member 70 is laid on the bottom surface of said depression 52 in a way such that second end 80 always comes into frictional contact with the bottom surface of depression 52 allowing the first conduction member to have elastic properties. Therefore, when the terminal 74 is pressed downwardly by an external force, said terminal 74 is elastically biased upwardly by the restoring force of the first conduction member 70.

Figure 7:
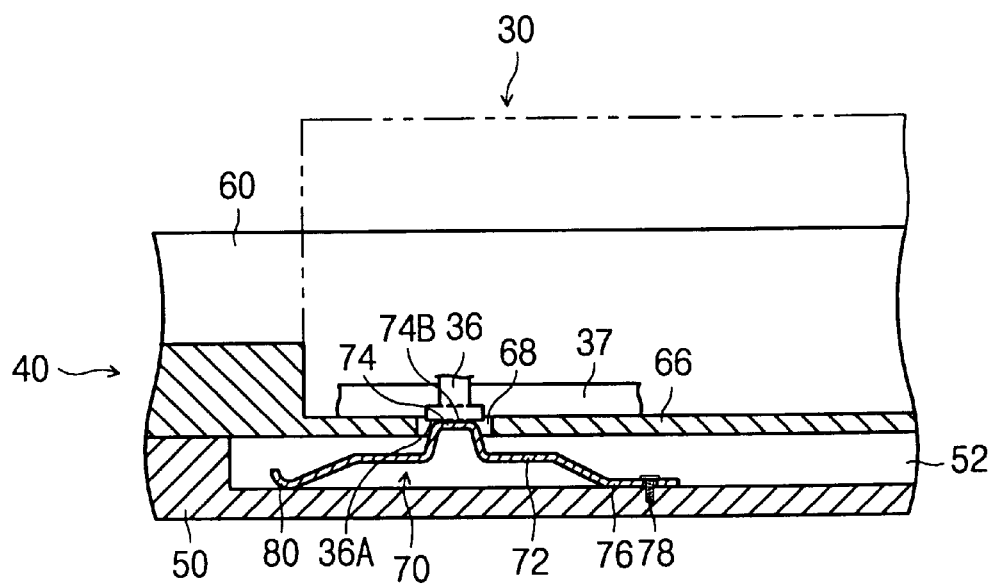
FIG. 7 is a cross-sectional view showing the portable computer and docking station of FIG. 3 in engagement.

FIG. 7 is a cross-sectional view showing the position of the first conduction member when the portable computer, along with the second conduction member, is engaged with the docking station of this invention. While portable computer 30 is engaged with docking station 40, second conduction member 36 comes into contact with the terminal 74 of the first conduction member 70. This causes first conduction member 70 to be slightly compressed by second conduction member 36 and results in free end 80 of first conduction member 70 moving slightly outwardly along the bottom surface of depression 52. Thus, it is possible for terminal 74 to continuously contact second conduction member 36 without being damaged by the pressure exerted by the portable computer. When the conduction members are in contact, upper surface 74B of first conduction member 70 is in contact with lower surface 36A of second conduction member 36. In addition, second conduction member 36 contacts and is grounded to conductive layer 37 of the portable computer.

An apparatus for preventing electromagnetic interference between portable computers and docking stations for such computers is disclosed. Together, the first and second conduction members join the grounds of the portable computer and the docking station to effectively prevent the leakage of electromagnetic waves between the devices. Although this preferred embodiment of the present invention has been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. A computer system, comprising:
    a portable computer enclosing a central processing unit, bearing a keyboard and a first interface port, and having a rotatably mounted lid containing a display device generating variable images under the control of both said processing unit and said keyboard;
    a docking station comprising a tray and a structure bearing a second interface port to operationally connect to said first interface port of said portable computer to interface said central processing unit of said portable computer with said docking station, said structure and said tray of said docketing station being separate components attached to form said docking station;
    a first conduction member formed of a conductive material, attached to said tray of said docketing station, and grounded to said docking station, said first conduction member having a first end fastened to said tray and a second end abutting said tray to allow elasticity and movement of said first conduction member in a direction perpendicular to a base of said docking station;

a second conduction member made of a conductive material and having a plug shape, mounted to said bottom side of said portable computer;

a conductive layer, having a predetermined thickness, attached along an inner surface of a housing of said portable computer and grounded to said second conduction member; and said second conduction member being electrically connected to said first conduction member while said portable computer is engaged with said docking station.

2. The computer system of claim 1, further comprised of said second conduction member being a plug inserted in said bottom side of said portable computer.

3. The computer system of claim 2, wherein said first conduction member is mounted in a depression in said tray.

4. The computer system of claim 3, with said first conduction being formed of a bent metal strip bent to exhibit elasticity.

5. The computer system of claim 4, further comprised of said first conduction member being, covered by a top wall while fastened in said depression, said top wall bearing a bore allowing a portion of said first conduction member to protrude above said top wall.

6. A computer system, comprising:

a portable computer enclosing a central processing unit, bearing a keyboard and a first interface pot, and having a rotatably mounted lid containing a display device generating variable images under the control of both said central processing unit and said keyboard;

a docking station comprising a tray and a structure bearing a second interface port to provide an operational connection to said first interface port of said portable computer to interface said central processing unit of said portable computer with said docking station as said tray receives said portable computer;

a first conduction member formed of an electrically conductive material, mounted on and grounded with said docking station with a first portion attached to said docking station and covered by said structure from contact with the computer, and an intermediate distally extending portion flexibly supported by said first portion and exposed to said contact by said structure;

a second conduction member made of an electrically conductive material and having a plug shape, mounted on said bottom side of said portable computer and grounded to said computer with an exposed surface of said plug shape positioned to displace said intermediate portion in a direction traverse to movement of the computer as said tray receives the portable computer and to continuously electrically mate with said intermediate portion as said tray receives and makes said operational connection with said portable computer; and said second conduction member being positioned to remain electrically connected to said first conduction member while said portable computer is engaged with said operational connection with said docking station.

7. The computer system of claim 6, further comprised of said second conduction member being a plug inserted in said bottom side of said portable computer.

8. The computer system of claim 7, further comprised of said plug being grounded to a conductive layer, having a predetermined thickness, formed on an inner surface of a housing of said portable computer.

9. The computer system of claim 8, wherein said first conduction member is mounted on a depression in said tray.

10. The computer system of claim 9, with said first conduction member being formed of a bent metal strip bent to exhibit elasticity.

11. The computer system of claim 10, further comprised of said first conduction member having a first end fastened to said tray and a second end abutting said tray to allow elasticity and movement of said first conduction member in a direction perpendicular to a base of said docking station.

12. The computer system of claim 11, further comprised of said first conduction member being covered by a top wall while fastened in said depression, said top wall bearing a bore allowing a portion of said first conduction member to protrude above said top wall.

13. The computer system of claim 12, further comprising a peripheral device engaged with said portable computer via said docking station.

14. The computer system of claim 13, further comprising said tray and said structure of said docking station being separate components attached to form said docking station.

15. A computer system, comprising:

a portable computer enclosing a central processing unit, bearing a keyboard and a first interface port, and having a rotatably mounted lid containing a display device generating variable images under the control of both said central processing unit and said keyboard;

a docking station having a tray and a structure bearing a second interface port to operationally connect to said first interface port of said portable computer to interface said central processing unit of said portable computer with said docking station;

a first conduction member formed of a conductive material, attached to said tray of said docking station, and grounded to said docking station, said first conduction member having a first end fastened to said tray and a second end abutting said tray to allow elasticity and movement of said first conduction member in a direction perpendicular to a base of said docking station;

a second conduction member made of a conductive material and having a plug shape, mounted to said bottom side of said portable computer;

a conductive layer, having a predetermined thickness, attached along an inner surface of a housing of said portable computer and grounded to said second conduction member; and said second conduction member being electrically connected to said first conduction member while said portable computer is engaged with said docking station.

16. The computer system of claim 15, further comprised of said second conduction member being a plug inserted in said bottom side of said portable computer.

17. The computer system of claim 16, wherein said first conduction member is mounted to a depression in said tray.

18. The computer system of claim 17, with said first conduction member being formed of a bent metal strip bent to exhibit elasticity.

19. The computer system of claim 18, further comprised of said first conduction member being covered by a top wall while fastened in said depression, said top wall bearing a bore allowing a portion of said first conduction member to protrude above said top wall.

20. The computer system of claim 19, further comprising said tray and said structure of said docking station being separate components attached to form said docking station.

\* \* \* \* \*